(12) United States Patent
Kusase et al.

(10) Patent No.: US 6,335,583 B1
(45) Date of Patent: Jan. 1, 2002

(54) STATOR OF VEHICLE AC GENERATOR AND METHOD OF MANUFACTURING THE SAME

(75) Inventors: Shin Kusase, Obu; Atsushi Umeda, Okazaki; Tsutomu Shiga, Nukata-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/315,985

(22) Filed: May 21, 1999

(30) Foreign Application Priority Data

May 25, 1998 (JP) .................................. 10-143008
Jul. 15, 1998 (JP) .................................. 10-200553

(51) Int. Cl.$^7$ .............................. H02K 1/00; H02K 1/12
(52) U.S. Cl. ......................... 310/254; 310/201; 310/216
(58) Field of Search ..................................... 310/201, 254, 310/216, 179, 180, 195, 203, 208, 214, 215

(56) References Cited

U.S. PATENT DOCUMENTS

| | | | | |
|---|---|---|---|---|
| 1,275,195 A | * | 8/1918 | Apple | 310/201 |
| 1,822,261 A | | 9/1931 | Apple | 310/201 |
| 2,928,963 A | | 3/1960 | Bertsche et al. | 310/168 |
| 3,917,967 A | * | 11/1975 | Robison et al. | 310/42 |
| 4,663,835 A | * | 5/1987 | Caillier, Sr. | 29/598 |
| 5,097,167 A | | 3/1992 | Kanayama et al. | 310/201 |
| 5,477,096 A | * | 12/1995 | Sakashita et al. | 310/216 |

FOREIGN PATENT DOCUMENTS

| | | |
|---|---|---|
| DE | 760402 | 3/1954 |
| GB | 1194085 | 6/1970 |
| JP | 50-47102 | 4/1975 |
| JP | 360051427 A | 3/1985 |
| JP | 62-272836 | 11/1987 |
| JP | 63-274335 | 11/1988 |
| JP | 64-5340 | 4/1991 |
| JP | 4-17539 | 1/1992 |
| JP | 8-205441 | 8/1996 |
| WO | 92/06527 | 4/1992 |
| WO | 97/40567 | 10/1997 |

OTHER PUBLICATIONS

Patent Abstracts of Japan, vol. 006, No. 067 re JP 57–009244 (Apr. 1982).

Patent Abstracts of Japan, vol. 097, No. 011 re JP 09–191614 (Nov. 1997).

\* cited by examiner

Primary Examiner—Nestor Ramirez
Assistant Examiner—Guillermo Perez
(74) Attorney, Agent, or Firm—Pillsbury Winthrop LLP

(57) ABSTRACT

A stator of an ac generator for vehicle has a stator core which is a lamination of steel sheets and has a plurality of slots cut out in a slot-cutout direction. A plurality of insulators and, subsequently, electric conductors are respectively inserted into the plurality of slots in the slot-cutout direction. The insulators are prevented from being damaged by sharp-edged burs formed when the plurality of conductor segments are inserted in the slot-cutout direction.

9 Claims, 11 Drawing Sheets

STATOR OF VEHICLE AC GENERATOR AND METHOD OF MANUFACTURING THE SAME

CROSS REFERENCE TO RELATED APPLICATION

The present application is based on and claims priority from Japanese Patent Applications Hei 10-143008 filed on May 25, 1998 and Hei 10-200553 filed on Jul. 15, 1998, the contents of which are incorporated herein by reference.

BACKGROUND OF THE INVENTION

1. Field of the Invention

The present invention relates to a stator of a vehicle ac generator driven by an internal combustion engine and a method of manufacturing the same.

2. Description of the Related Art

It is known that a plurality of conductor segments are welded to form a stator winding of a stator of an ac generator for a vehicle. For example, WO92/06527 discloses a stator whose stator winding is formed of a plurality of U-shaped conductor segments. The conductor segments are inserted from an end of the stator core and connected to one another at portions thereof on the other end of the stator core. The stator can have regularly disposed coils more easily than the stator having a stator winding of continuously wound magnet wires.

In WO92/06527, there is no description about the insulator disposed between the conductor segment and the stator core. However, such electric insulators are necessary under some circumstances. It is preferable that such insulators are inserted into the slots easily together with the conductor segments. Such insulators are insulation layers known as insulation coatings of magnet wires, insulation sheets disposed between conductor segments and a stator core, or insulation layers covering inner surfaces of the slots of the stator.

It is well-known that a stator core is a lamination of stamped-out steel sheets having a plurality of slots. When the sheets are cut by a stamping machine, burs having sharp edges are formed on the peripheral corners of the sheet. The outer and inner peripheral edges of the stator core can be lathed or squeezed easily to remove the burs, thereby providing accurate sizes and roundness. However, the burs on the peripheral edges of the slots are not removed. Therefore, if conductor segments are merely inserted into such slots as disclosed in WO/92/62527, the insulation coating of the conductor segments may be broken by the sharp edges of the burs on the peripheral edges of the slots.

SUMMARY OF THE INVENTION

Therefore, a main object of the invention is to provide a stator of an ac generator that has a good insulation structure for protecting the slot-insulation layer from damage and a method of manufacturing its stator.

According to a main feature of the invention, a stator includes a stator core having a plurality of slots, a plurality of conductor segments disposed in the slots, and a plurality of insulation layers disposed between inner peripheries of the slots and the conductor members. The stator core is a lamination of steel sheets having the plurality of slots cut out in a cutout direction to provide burs projecting from each of the steel sheets in the cutout direction, and the conductor segments are inserted into the plurality of slots in the same direction as the cutout direction. Accordingly, the insulation layers are inserted into the slots smoothly and are not damaged when the conductor segments are inserted into the plurality of slots. Each of the conductor segments can have a U-turn portion at the back end of the stator core in the cutout direction.

The stator core is a lamination of steel sheets having the plurality of slots cut out in a cutout direction, and the electric conductors are inserted into the plurality of slots in the same direction as the cutout direction.

Accordingly, the conductor segments can be inserted smoothly into the slots.

Each of the electric conductor segments can have a U-turn portion at the back end of the stator core in the cutout direction. Therefore, the insulators can be prevented from being damaged when the conductor segments are inserted.

Each of the insulation layers can have a folded lip at the back end thereof in the cutout direction. As a result, the insulators can be prevented from being damaged when the conductor segments are inserted.

Each of the insulation layers can have a folded lip at the front end thereof in the cutout direction. As a result, the insulator can be prevented from being damaged when the conductor segments are bent to form coil ends.

Another object of the present invention is to provide a method of manufacturing such a stator.

According to another feature of the invention, a method of manufacturing a stator of a vehicle ac generator is composed of a first step of forming a lamination of steel sheets, a second step of cutting a plurality of slots from the lamination in a cutout direction, a third step of inserting insulators into the slots in the cutout direction, a fourth step of inserting conductor segments into the slots in the cutout direction; and a fifth step of connecting the conductor segments extending from the slots to one another.

BRIEF DESCRIPTION OF THE DRAWINGS other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An embodiment of the present invention is described with reference to the appended drawings.

Figure 1:
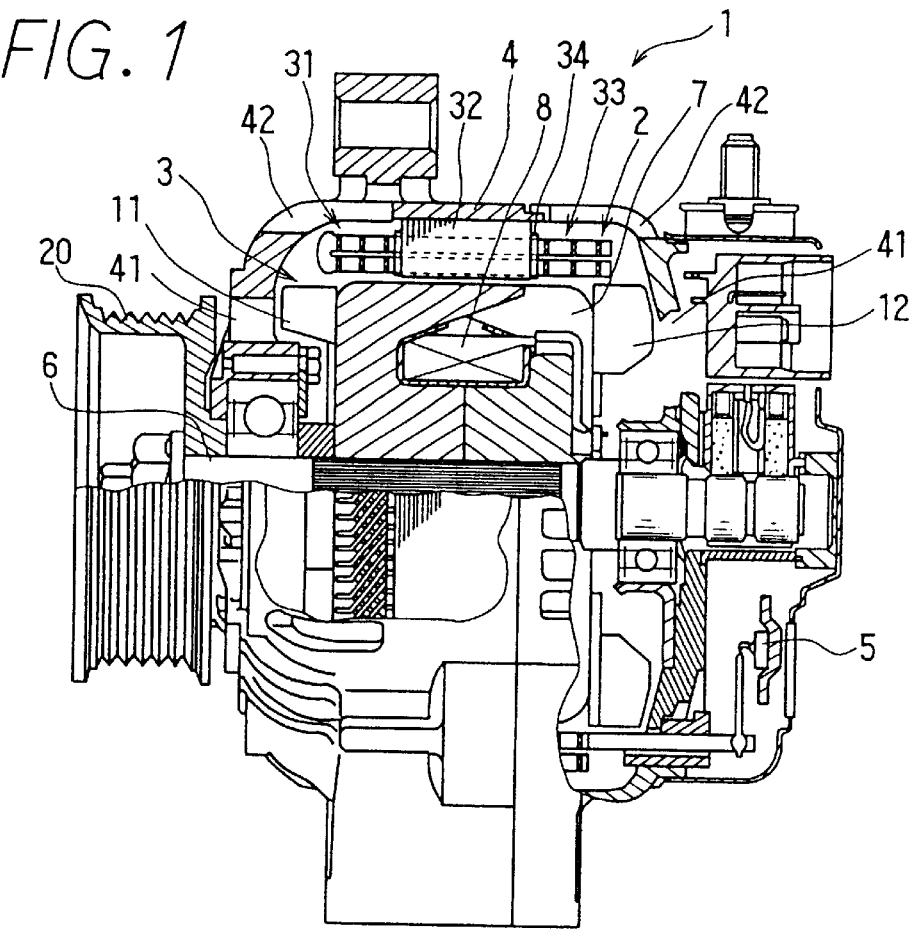
FIG. 1 is a cross-sectional view illustrating an ac generator for a vehicle according to an embodiment of the invention.

As shown in FIG. 1, ac generator 1 includes stator 2, rotor 3, frame 4, rectifier 5 etc. Stator 2 is composed of stator core 32, a plurality of conductor segments 33 forming a stator winding and a plurality of insulators 34. Stator core 32 is a lamination of steel sheets, which has a number of slots formed inside thereof. The plurality of conductor segments project from opposite ends of stator core 32 to form coil ends 31 and are connected to one another to form a stator winding.

Rotor 3 has field coil 8, a pair of front and rear pole cores 7 and shaft 6. Front and rear pole cores 7 respectively have six claw pole pieces extending axially to enclose field coil 8. Field coil 8 has a cylindrical body covered by an insulating coating. Axial flow type cooling fan 11 is welded to the front side pole core 7. Cooling fan 11 blows cooling air in the radial and axial direction from the front side thereof. Centrifugal cooling fan 12 is welded to the rear side pole core 7 to blow cooling air radially outward from the rear side thereof.

Frame 4 accommodates stator 2 and rotor 3 and supports rotor 3 to rotate with shaft 6. Stator 2 is fixed to frame 4 around the pair of pole cores 7 at a certain gap therefrom. Frame 4 has air discharge vents 42 at portions opposite coil ends 31 of stator 2 and air intake vents 41 at the axial ends thereof.

AC generator 1 described above is rotated in a certain direction by an engine (not shown) via a belt and a pulley 20. When field coil 8 is energized by an outside power source, each of the pole pieces of pole cores 7 is excited, so that the stator winding can provide a three-phase ac voltage. Thus, rectifier 5 provides a certain amount of dc current at the output terminals.

Figure 2:
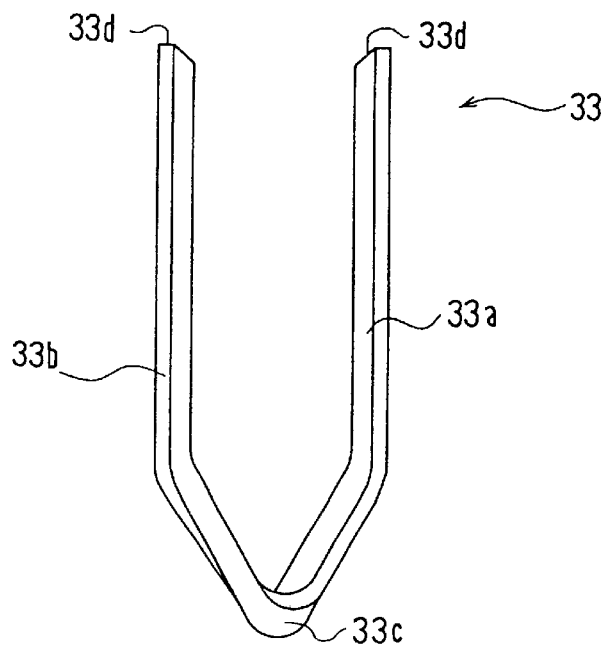
FIG. 2 is a perspective view of a conductor segment forming a part of stator winding of a stator according to a first embodiment of the invention.

As illustrated in FIG. 2, conductor segments 33 is a U-shaped member made of conductive metal (e.g. copper) bar or plate which has U-turn portion 33c. Conductor segment 33 has inner conductor portion 33a, outer conductor portion 33b and U-turn portion 33c between inner and outer conductor portions 33a, 33b. Each of inner conductor portions 33a has straight inner portion disposed in the radially inner layer of the winding and each of outer conductor portions 33b has straight outer portion disposed in the radially outer layer of the winding.

Figure 3:
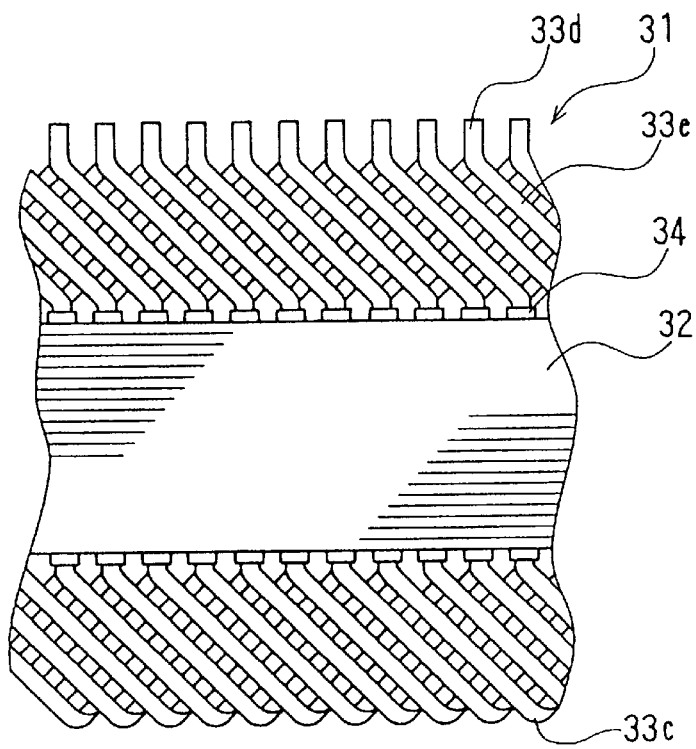
FIG. 3 is a fragmentary side view of the stator according to the first embodiment.

As illustrated in FIG. 3, U-turn portions 33c are disposed at one axial end of stator core 32, and slant portions 33e forming coil ends 31 are disposed at the other axial end of stator core. Slant portions 33e of conductor segments 33 in the outer layer extend in one direction and slant portion 33e of conductor segment 33 in the inner layer extend in the other direction. Straight ends 33d of conductor segments 33 are welded to one another by an ultrasonic wave welder or an arc welder, or are soldered or mechanically connected to one another.

Figure 4:
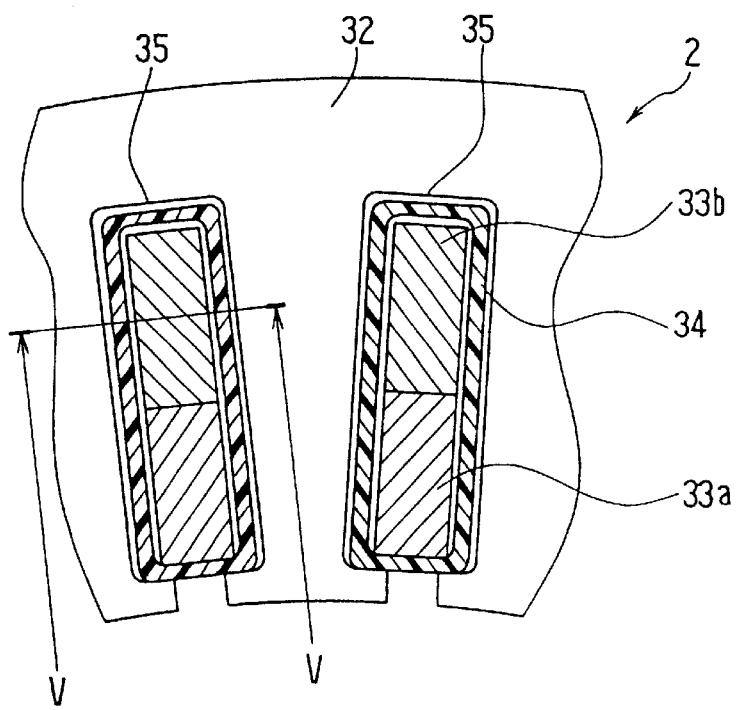
FIG. 4 is a fragmentary cross-sectional view of the stator shown in FIG. 3.

A pair of conductor segments 33 is disposed in each one of slots 35 and is connected to one another. As illustrated in FIG. 4, inner and outer conductor portions 33a, 33b of each of conductor segments 33 has rectangular cross-section with circumferential sides being longer than its radial sides. Conductor segments 33 are coated with insulation film to insulate one segment from another. Insulators 34 insulate each of conductor segments from the inner surface of slots 35.

Figure 5:
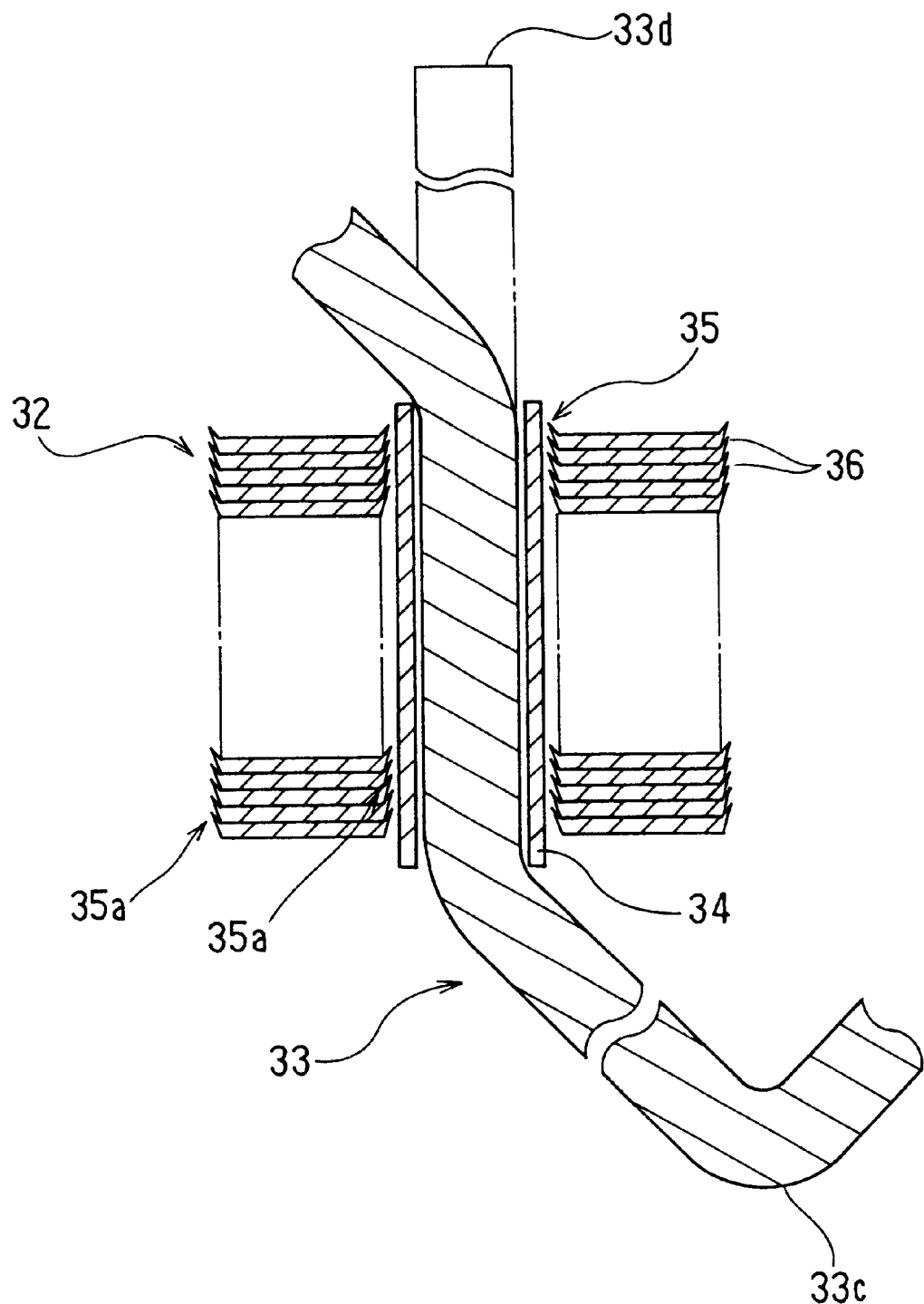
FIG. 5 is a cross-sectional view of the stator shown in FIG. 4 cut along line V—V.
Figure 6:
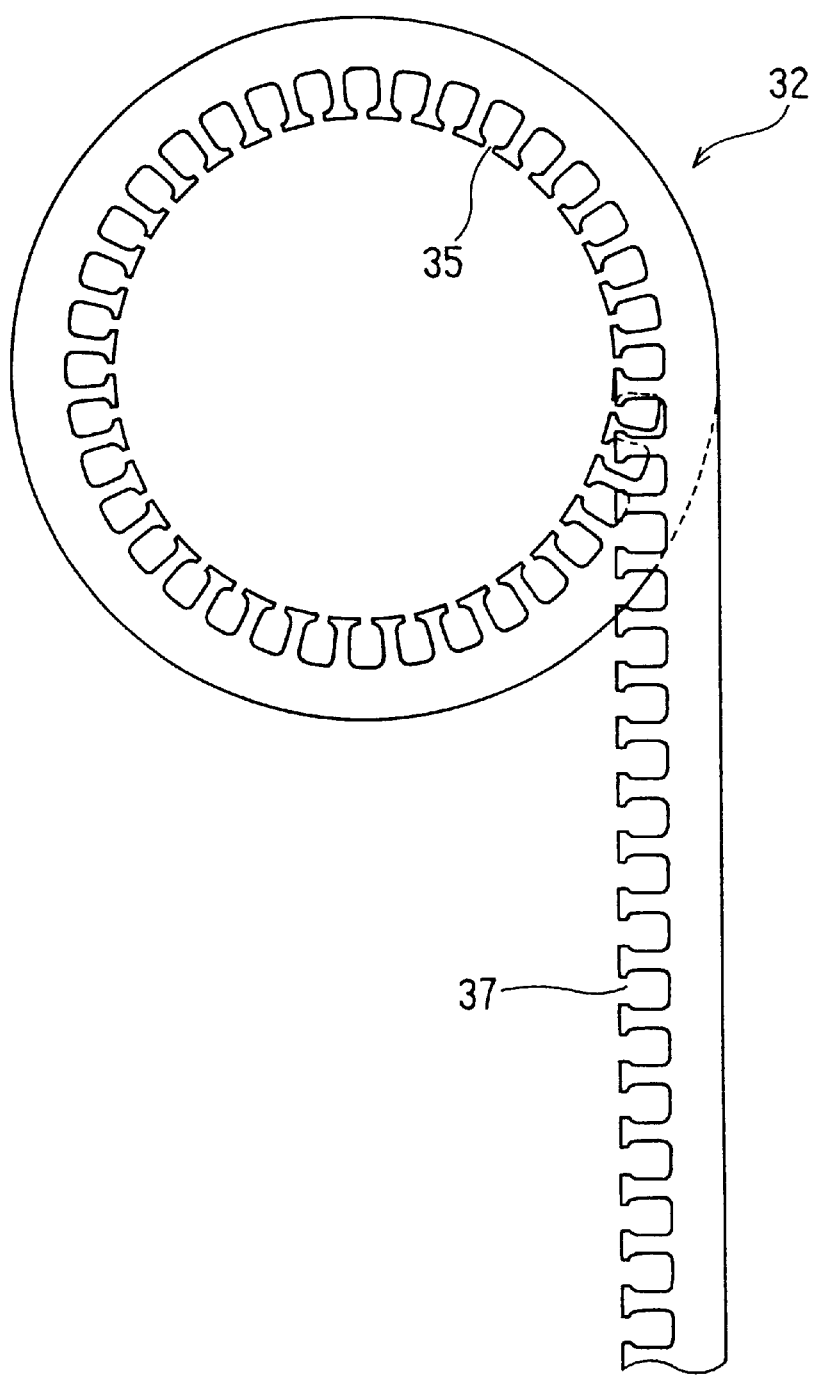
FIG. 6 is an illustration of forming laminated stator core of steel sheets.

Stator core 32 is a lamination of a spirally-wound belt-like steel sheet 36 as shown in FIG. 6. A plurality of concavities 37 are cut out from the belt-like steel sheet in the same direction to form a plurality of slots with sharp edges or burs 35a projecting in the cutout direction. In FIG. 5, U-turn portions 33c are disposed on the back axial end of the stator core in the cutout direction. Each of conductor segments 33 has side surfaces in parallel with the inner wall of slot 35, thereby providing a high space factor of conductor segments 33.

Figure 7:
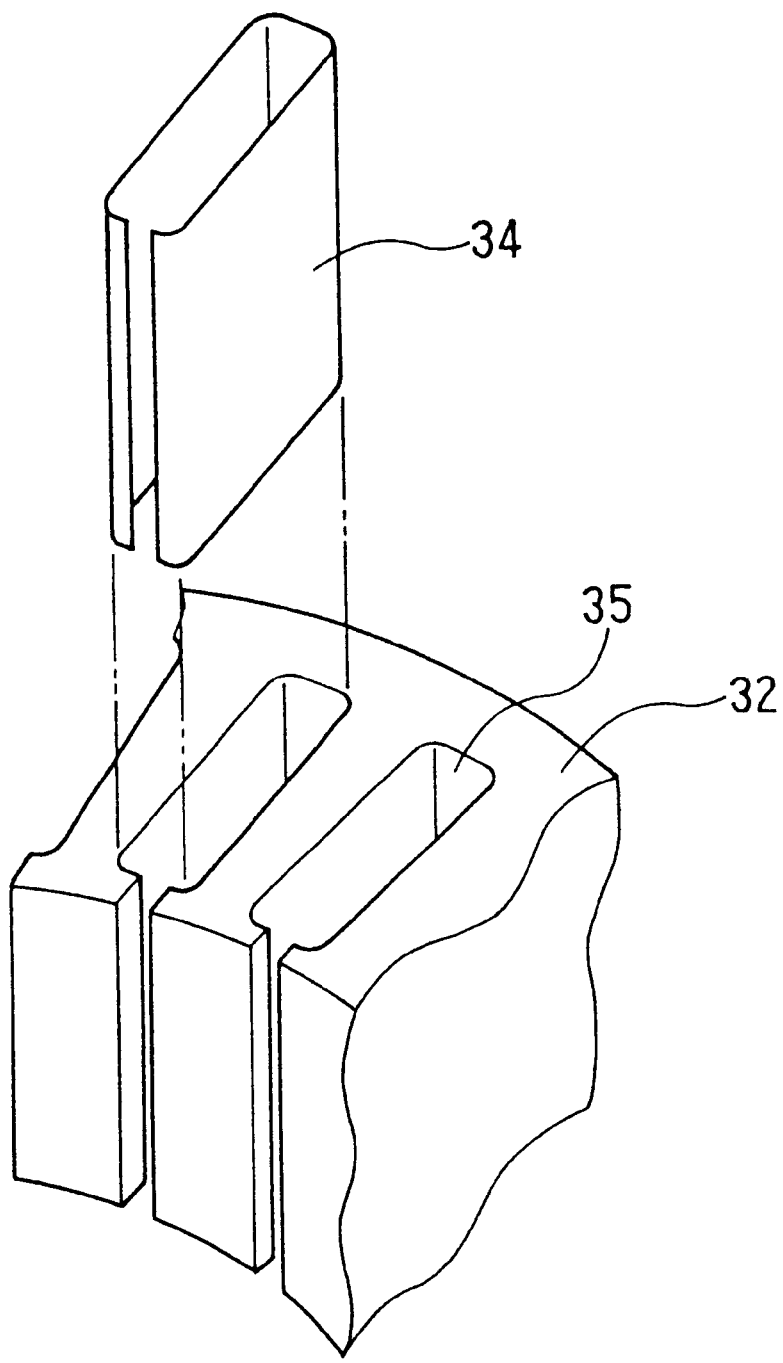
FIG. 7 is a perspective view illustrating an insulator being inserted into a slot of the stator according to the first embodiment.

Insulator 34 is made from an insulation sheet. As shown in FIG. 7, the insulation sheet is formed to fit the inner periphery of slot 35. Preferably, each of insulators 34 is inserted into one of slots 35 from the back end of the stator core in the cutout direction. Therefore, insulators 34 can be inserted smoothly into slots 35.

Figure 8:
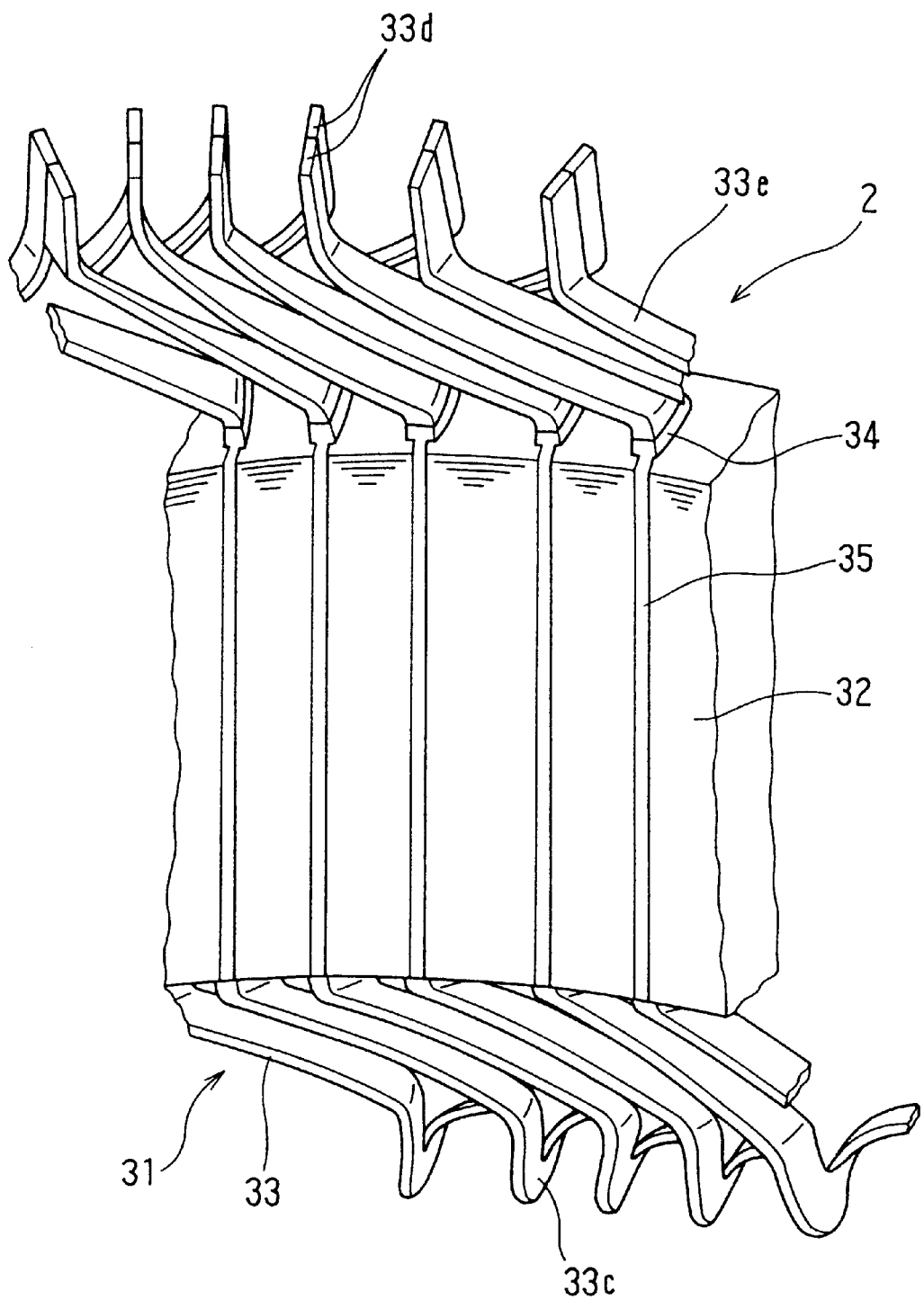
FIG. 8 is a perspective view illustrating coil ends on both ends of the stator according to the first embodiment.

After insulator 34 is inserted into each of slots 35, a number of U-shaped conductor segments 33 are lined up so that U-turn portions 33c can be disposed at the back end of stator core 32 in the cutout direction or in the same direction as the burs extend. As shown in FIG. 4, outer conductor portions 33b are inserted into the inside portion of slots 35, and inner conductor portions 33a are inserted into the outside portion of slots 35. Each of conductor segments 33 is made of a U-shaped copper plate, which is press-fitted into one of slots 35 so that opposite surfaces of outer and inner conductor portions 33b, 33a can fit the parallel walls of slot 35 via insulators 34. Thereafter, two straight ends 33d of each of conductor segments 33 are bent in the opposite directions respectively to connect to respective straight ends 33d extending from different layers of different slots 35 as shown in FIG. 8.

Figure 9:
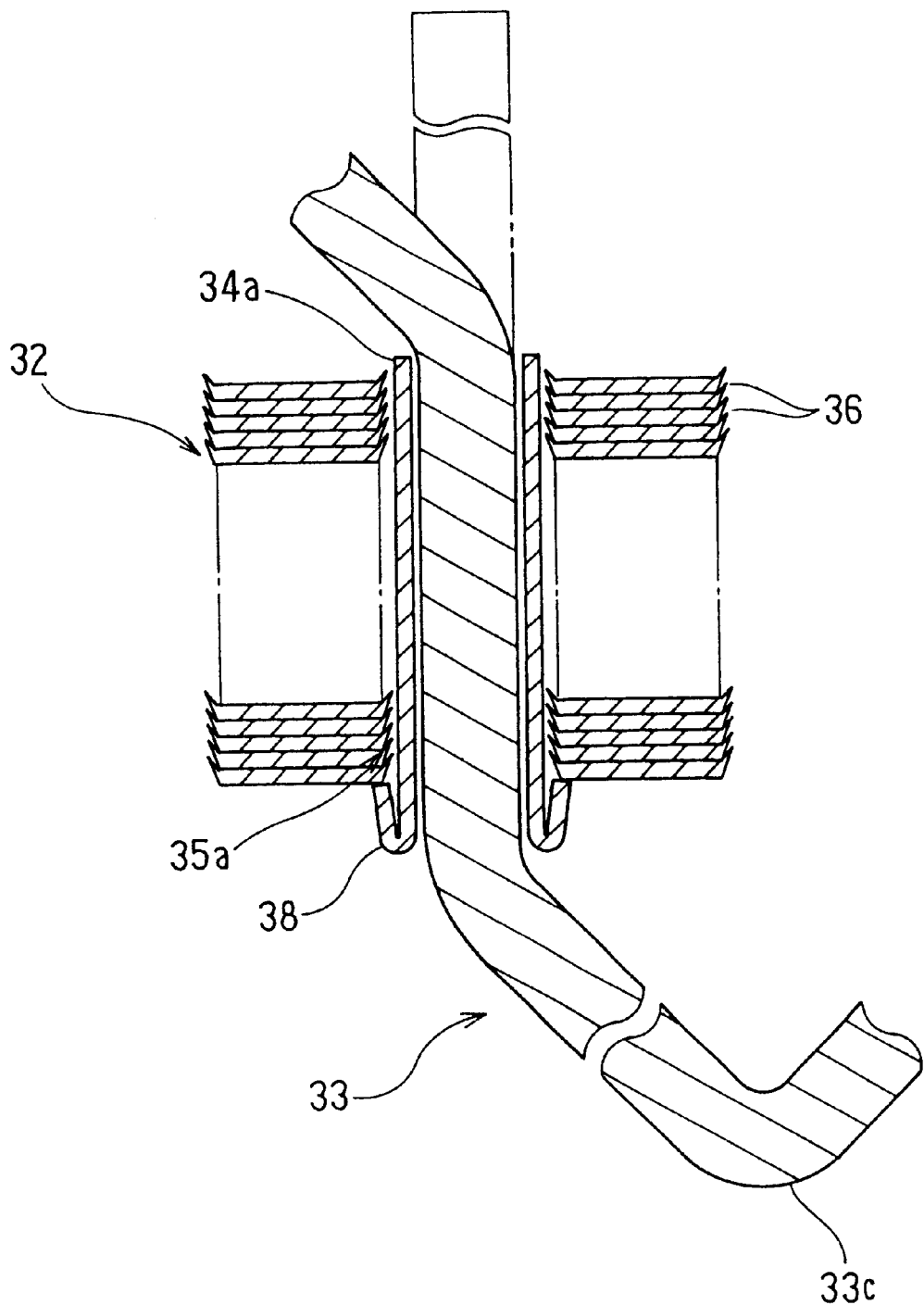
FIG. 9 is a fragmentary cross-sectional view of the stator according to the first embodiment having an insulator with folded lip at an end thereof.

As a variation such as shown in FIG. 9, insulators 34a can have a folded lip 38 as a stopper at one end. Folded lip 38 is disposed at the end of stator core 32 toward U-turn portion 33c or the back end of the stator core 32 in the cutout direction. The insulators 34a are inserted into slots 35 so that folded lips 38 can engage the back end of stator core 32 in the cutout direction, and conductor segments 33 are subsequently inserted into slots 35. Accordingly, the insulators 34a can be held by folded lips 38 at the correct axial position.

Figure 10:
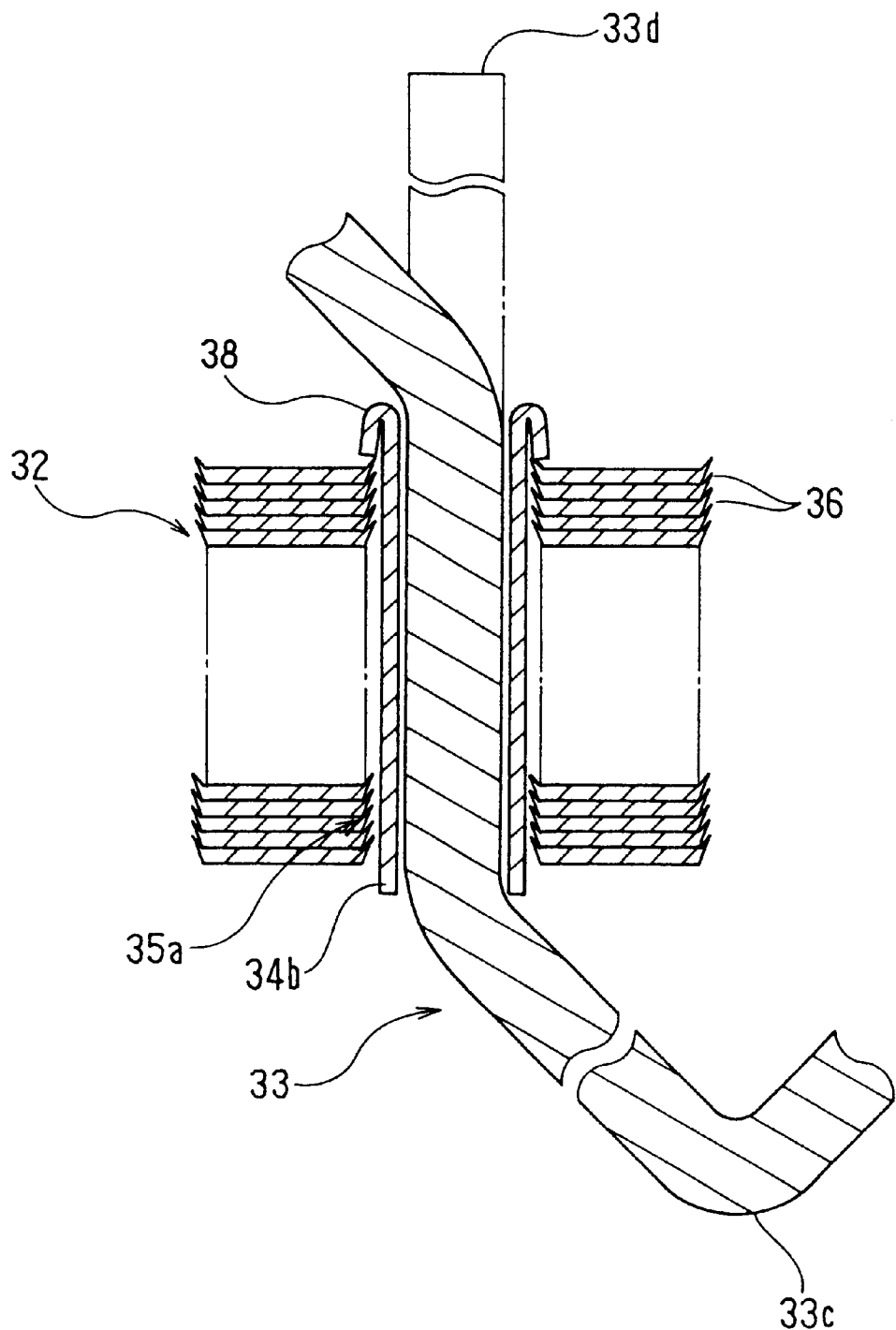
FIG. 10 is a fragmentary cross-sectional view of a variation of the stator according to the first embodiment having an insulator with folded lip at the other end thereof.

As another variation as shown in FIG. 10, insulator 34b are inserted from the front end of stator core 32 with folded lips 39 on the front end in the cutout direction. Therefore, the insulators 34b can be prevented by folded lips 39 from being damaged when segment ends 33d are bent to form coil ends as illustrated in FIG. 10.

Folded lip 39 can be substituted by another equivalent expanded structure for positioning the insulator such as a flared lip.

Figure 11:
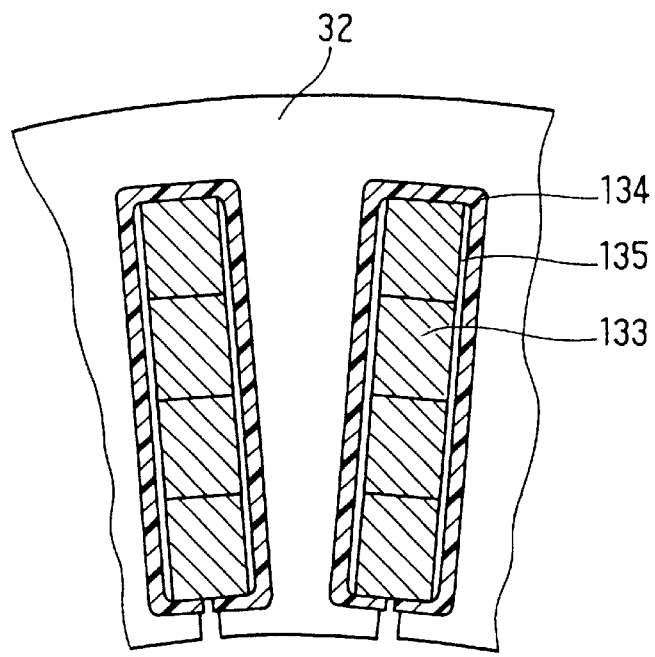
FIG. 11 is a fragmentary cross-sectional view of a stator according to a second embodiment of the invention.
Figure 12:
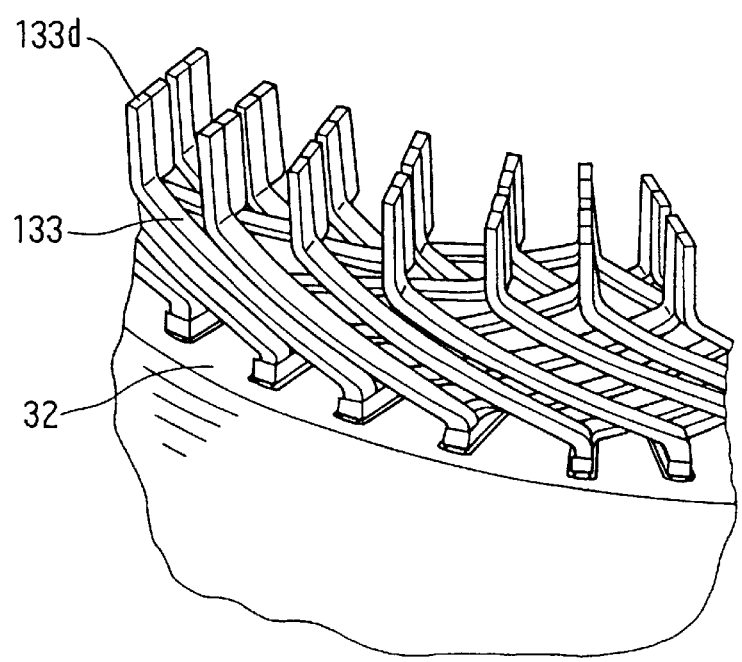
FIG. 12 is a fragmentary perspective view of the stator according to the second embodiment.

A stator according to a second embodiment of the invention is shown in FIG. 11. The stator according to the second embodiment has four conductor segments 133, which are lined up in the radial direction in each of slots 135. Conductor segments 133 are connected in the manner illustrated in FIG. 12. Each of four conductor segments 133 extends from one of slots 135 in an alternately different direction. Conductor segments 133 on this side of FIG. 12 extend clockwise and those on the opposite side extend counterclockwise. End portion 133d of one conductor segment 133 is connected to end portion 133d of another conductor segment 133 spaced apart at a certain pitch. Conductor segments 133 in the innermost layer are connected to those in the second inner layer, and conductor segments in the third layer are connected to those in the outermost layer.

Figure 13:
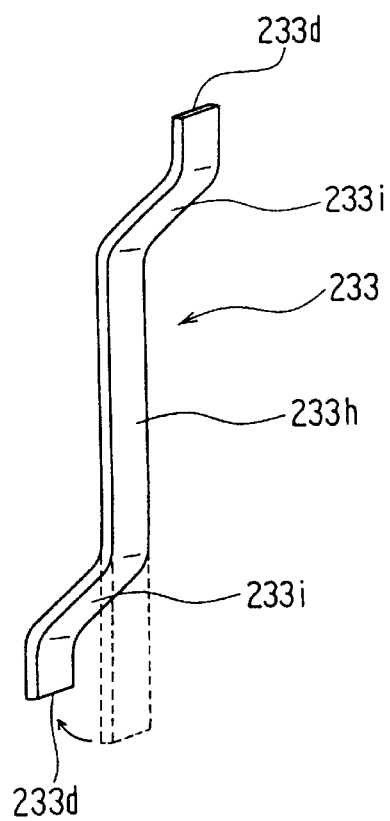
FIG. 13 is a perspective view illustrating a variation of conductor segment.
Figure 14:
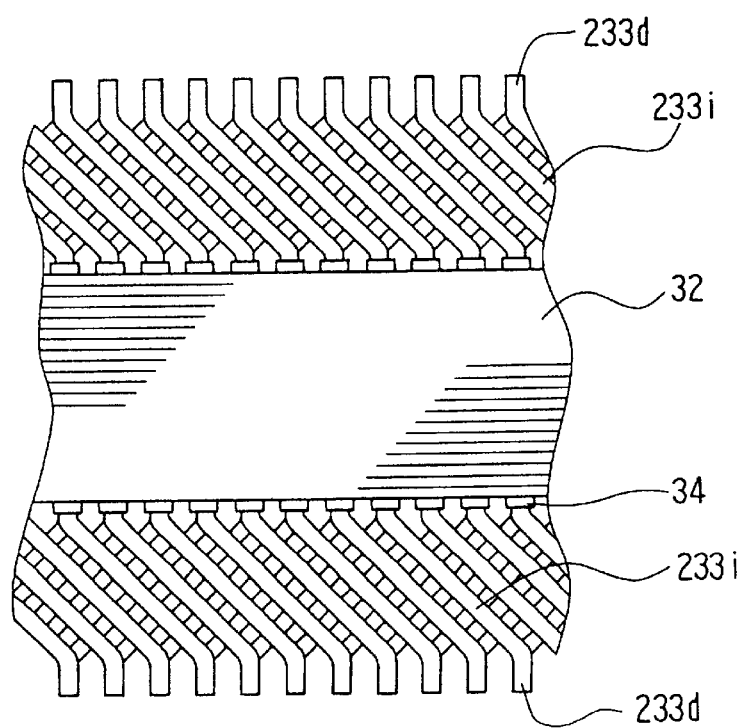
FIG. 14 is a side view of a stator according to a third embodiment of the invention having the conductor segments shown in FIG. 13.

A stator according to a third embodiment of the invention has a pair of I-shaped or J-shaped conductor segments 233 instead of U-shaped conductor segments 33 as shown in FIG. 13. Each of conductor segments 233 has straight inner conductor portion 233h and two straight outer conductor portions 233i extending outward from the opposite ends of inner conductor portion 233h. One of outer conductor portions 233i is bent as shown in FIG. 13. As shown in FIG. 14, opposite end portions 233d of one conductor segment 233 are connected to end portions 233d of other conductor segments 233 to form a stator winding. Conductor segments 233 are simple in shape and easy to manufacture. Because each of conductor segments 233 corresponds to one of insulators 34, it is easy to insert insulators 34 and conductor segments 233 into slots 35.

Figure 15:
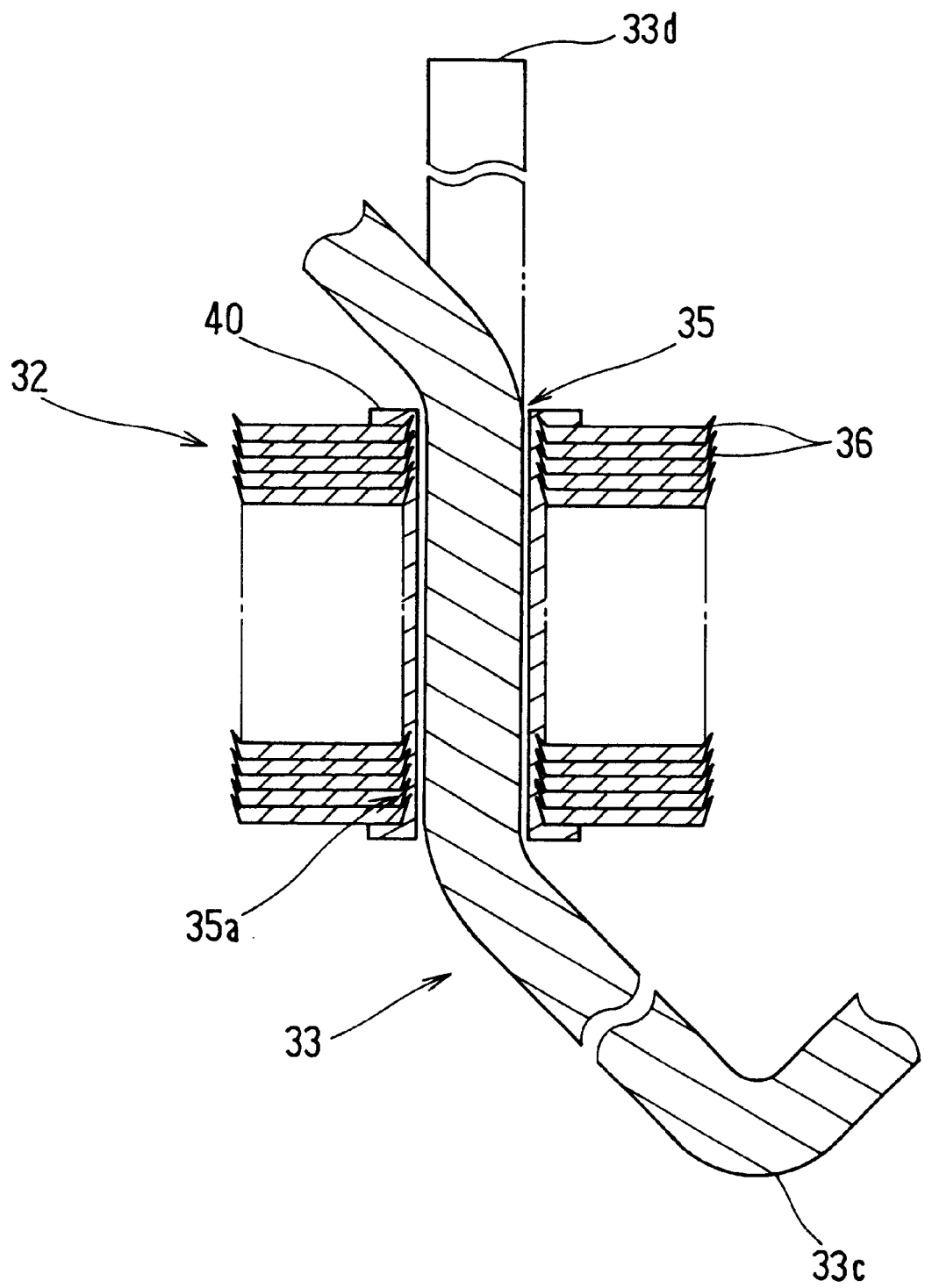
FIG. 15 is a fragmentary cross-sectional view of a variation of the stator according to the first embodiment.

As shown in FIG. 15, insulation resin coating 40 can be coated on the inner surface of slots 35 instead of insulators 34 made of insulation sheets. The coating can be prevented from being damaged if conductor segments 33 are inserted in the same direction as the burs extending, thereby ensuring good insulation between conductor segments 33 and stator core.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator of an ac generator for vehicle comprising:
   a stator core having a first end, a second end, and a plurality of slots formed in a predetermined direction directed from said first end to said second end;
   a plurality of conductor segments disposed in said slots, each of said conductor segments having at least one end first inserted into said slots from said first end to said second end; and
   a plurality of insulation layers fitted to the inner periphery of said slots and disposed between inner peripheries of said slots and said conductor segments; wherein
   said stator core comprises a plurality of laminated steel sheets,
   said plurality of slots have burrs projecting from each of said steel sheets toward said second end in said predetermined direction, and
   a plurality of said ends of said conductor segments are disposed at said second end for providing a plurality of connections connecting a pair of said ends of said conductor segments at said second end of the stator core.

2. The stator as claimed in claim 1, wherein
   each of said conductor segments has a U-turn portion at a back end of said stator core in said predetermined direction.

3. The stator as claimed in claim 1, wherein
   each of said insulation layers has a lip at a back end thereof in said predetermined direction.

4. The stator as claimed in claim 1, wherein
   each of said insulation layers has a lip at said second end.

5. The stator as claimed in claim 1, wherein each of said insulation layers is first inserted into one of said slots disposed at said second end.

6. A stator of an ac generator for a vehicle comprising:
   a stator core having a plurality of slots formed in a predetermined direction directed from a first end to a second end of the stator core;
   a plurality of conductor segments disposed in said slots, each of said conductor segments having at least one end first inserted into one of said slots from said first end to said second end; and
   a plurality of insulation layers disposed between inner peripheries of said slots and said conductor segments; wherein
   said stator core comprises a plurality of laminated steel sheets,
   said plurality of slots have burrs projecting from each of said steel sheets toward said second end in said predetermined direction,
   said at least one end of each of said conductor segments is inserted into one of said plurality of slots in said predetermined direction for providing a plurality of connections connecting a pair of said ends of said conductor segments at said second end of the stator core; and
   each of said conductor segments has side surfaces extending in parallel with inner walls of said slots.

7. A method of manufacturing a stator of a vehicle ac generator having a plurality of slots comprising:
   cutting steel sheets in a predetermined direction in a prescribed stator core pattern having a plurality of concavities, said predetermined direction being directed from a first end to a second end of said stator core pattern;
   forming a lamination of said cut steel sheets having said slots so that burrs extend from each of said slots in said predetermined direction toward the second end;
   inserting insulators into said slots in said predetermined direction toward the second end;
   inserting at least one end of each of said conductor segments into one of said slots in said predetermined direction toward the second end; and
   connecting said conductor segments extending from the second end of said slots to one another, wherein
   said inserting said at least one of each of said insulators into said slots includes:
   forming said insulators into a shape to fit the inner periphery of said slots so that said at least one end of each of said conductor segments can be inserted into said slots smoothly.

8. A stator of an ac generator for a vehicle comprising:
   a stator core composed of a plurality of laminated steel sheets forming a first axial end and a second axial end and having a plurality of slots press-formed in an axial direction directed from said first axial end to said second axial end thereof so that burrs project from each of said steel sheets toward the second axial end in the same axial direction;

a plurality of insulation layers fitted to inner peripheries of said slots, thereby providing therein sufficient space for said conductor segments; and a plurality of conductor segments each having at least one end first inserted into one of said plurality of slots disposed at said second axial end, wherein a plurality of said ends of the conductor segments are disposed at said second axial end of the stator core for providing a plurality of connections connecting a pair of said ends of the conductor segments at said second axial end of the stator core.

9. The stator as claimed in claim 8, wherein each of said insulation layers is first inserted into one of said slots disposed at said second axial end.

* * * * *